US012705180B2

(12) United States Patent
O'Hara et al.

(10) Patent No.: US 12,705,180 B2
(45) **Date of Patent: *Aug. 11, 2026**

(54) INDEX-BASED CACHE FOR KEY-VALUE STORAGE

(71) Applicant: Twilio Inc., San Francisco, CA (US)

(72) Inventors: Christopher O'Hara, Buderim (AU); Achille Roussel, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/083,016

(22) Filed: Mar. 18, 2025

(65) Prior Publication Data

US 2025/0284642 A1 Sep. 11, 2025

Related U.S. Application Data

(63) Continuation of application No. 18/073,470, filed on Dec. 1, 2022, now Pat. No. 12,253,952.

(51) Int. Cl.

| | |
|---|---|
| ***G06F 12/00*** | (2006.01) |
| ***G06F 12/0804*** | (2016.01) |
| ***G06F 12/0886*** | (2016.01) |
| ***G06F 12/14*** | (2006.01) |

(52) U.S. Cl.

CPC ...... *G06F 12/0886* (2013.01); *G06F 12/0804* (2013.01); *G06F 12/1466* (2013.01); *G06F 2212/1021* (2013.01)

(58) Field of Classification Search

CPC ............. G06F 12/0886; G06F 12/0804; G06F 12/1466; G06F 2212/1021

USPC .......................................................... 711/118

See application file for complete search history.

(56) References Cited

U.S. PATENT DOCUMENTS

2018/0107419 A1* 4/2018 Sachdev ................ G06F 3/064

OTHER PUBLICATIONS

"U.S. Appl. No. 18/073,470, Examiner Interview Summary mailed May 21, 2024", 2 pgs.

"U.S. Appl. No. 18/073,470, Examiner Interview Summary mailed Nov. 16, 2023", 2 pgs.

"U.S. Appl. No. 18/073,470, Final Office Action mailed Feb. 16, 2024", 10 pgs.

"U.S. Appl. No. 18/073,470, Non Final Office Action mailed Jun. 21, 2024", 9 pgs.

"U.S. Appl. No. 18/073,470, Non Final Office Action mailed Aug. 17, 2023", 9 pgs.

"U.S. Appl. No. 18/073,470, Notice of Allowance mailed Nov. 18, 2024", 5 pgs.

(Continued)

*Primary Examiner* — Mardochee Chery

(74) *Attorney, Agent, or Firm* — Schwegman Lundberg & Woessner, P.A.

(57) ABSTRACT

Various embodiments include systems, methods, and non-transitory computer-readable media for managing data using persistent storage. Consistent with these embodiments, a method includes receiving a write request that includes a value and a key; processing the write request, the processing of the write request including generating a message that includes the value; transmitting the message to an external system for storage of the value; generating an index based on a mapping of the key to an offset; and storing the value and the index in a local persistent storage.

20 Claims, 7 Drawing Sheets

(56) References Cited

OTHER PUBLICATIONS

"U.S. Appl. No. 18/073,470, Response filed May 16, 2024 to Final Office Action mailed Feb. 16, 2024", 9 pgs.
"U.S. Appl. No. 18/073,470, Response filed Sep. 23, 2024 to Non Final Office Action mailed Jun. 21, 2024", 10 pgs.
"U.S. Appl. No. 18/073,470, Response filed Nov. 17, 2023 to Non Final Office Action mailed Aug. 17, 2023", 10 pgs.

* cited by examiner

INDEX-BASED CACHE FOR KEY-VALUE STORAGE

CLAIM OF PRIORITY

This Application is a Continuation of U.S. application Ser. No. 18/073,470, filed Dec. 1, 2022, which is hereby incorporated by reference in its entirety.

TECHNICAL FIELD

The present disclosure generally relates to managing data using persistent storage, and, more particularly, various embodiments described herein provide for systems, methods, techniques, instruction sequences, and devices that facilitate efficient data access and management.

BACKGROUND

In high throughput systems, data needs to be accessed efficiently to avoid high latency on data processing paths and/or to reduce consumption of compute resources that are also allocated for handling core job execution logic.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
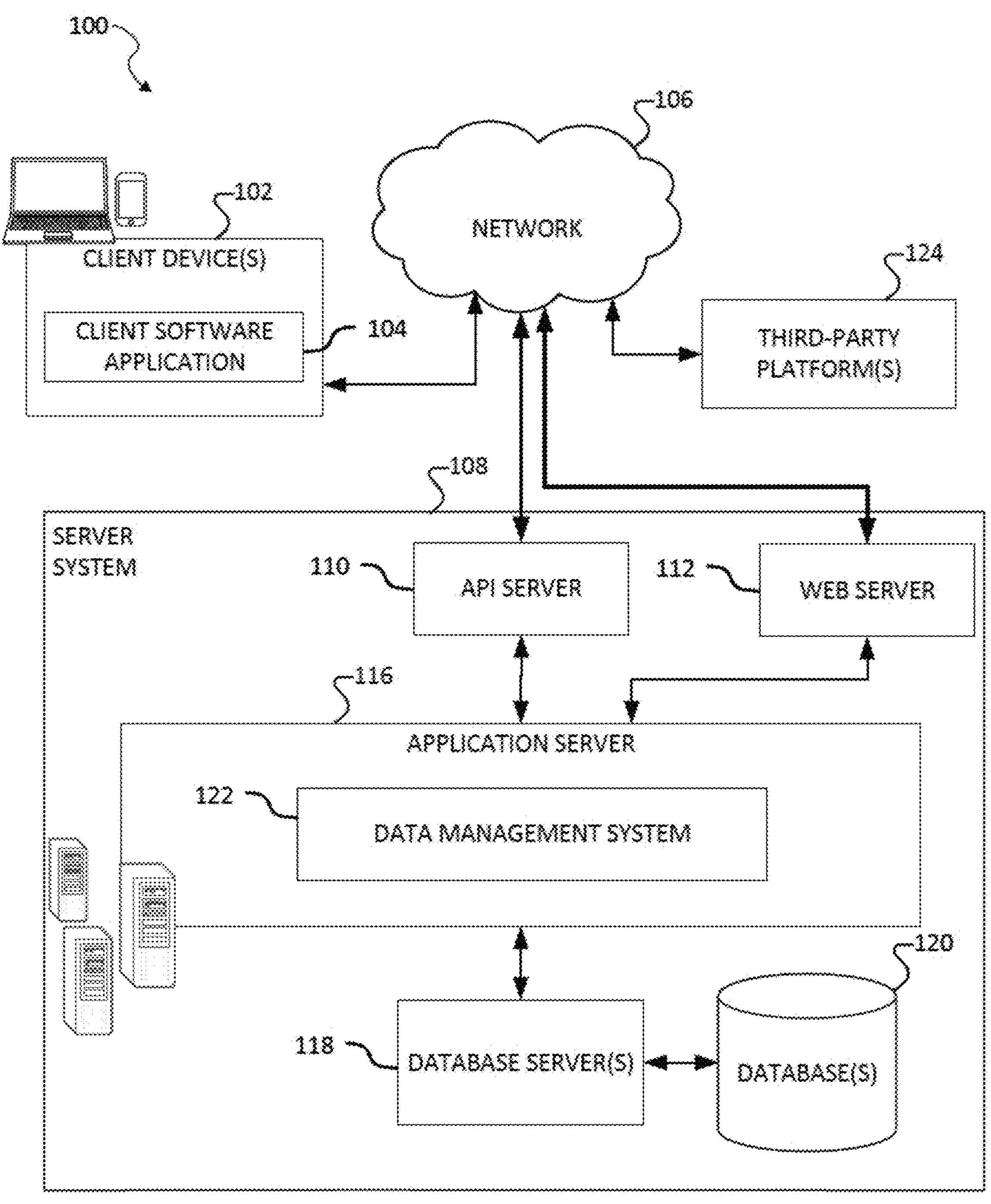
FIG. 1 is a block diagram showing an example networked environment that includes a data management system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

Because pieces of the data can be missing due to a lack of access, certain data (e.g., response payloads of executing a job, metadata associated with a response) requiring such missing pieces needs to be persisted before being processed or carried to the next stage of execution. Systems may provide solutions to handle such a situation by generating subgraphs that indicate the next stages of processing for the data that needs to be persisted. However, this approach may be inefficient and may cause system latency, especially when it comes to handling near real-time processing of a large volume of data in high throughput and multifaceted systems.

Various examples include systems, methods, and non-transitory computer-readable media for managing data using a persistent storage solution. Specifically, the disclosure is related to generating a multilayer key-value store using external storage units (e.g., Kafka partitions or partitions) that are backed by replicated logs. A data management system creates a compacted view (e.g., a copy) of external storage units in a local key-value store on a local persistent storage after consuming the data associated with write requests. The compact view contains copies of messages stored in the external storage units, so that customers can access data in the persistent local storage without needing to retrieve data from the external storage units. The disclosure is further related to addressing issues where messages may contain mutations (e.g., data changes) that apply to different keys of the key-value store. The data management system provides an indexing mechanism where the indexing mechanism translates keys to a list of messages stored on the local persistent storage that contains the keys, and reconstructs the values of the keys when reading the list of messages and applying the set of data changes to recreate the current value of the keys.

In various embodiments, upon receiving a write request that includes one or more values and one or more keys, a data management system processes the write request including generating one or more messages based on the one or more values and the one or more keys. The one or more messages represent (or include) the one or more values and the one or more keys included in the write request. A message may include a key field and a value field. In various embodiments, the one or more messages includes the one or more values without including the one or more keys associated with the one or more values.

The data management system transmits the message to an external system for storage (e.g., storage of the value) and generates one or more indexes based on a mapping of the one or more keys to one or more offsets (or offset values) associated with the one or more messages (or the storage of the one or more values). The external system may include one or more storage units, each of which may be a single log file that includes data written in an append-only fashion. An offset value may be an incremental and immutable number, maintained by the external system. In various embodiments, the external system distributes the storage units across multiple clusters for scalability and high message processing throughput. Each cluster may include one or more servers.

In various embodiments, an index may be generated based on a mapping of a key to an offset and/or a timestamp associated with the message In various embodiments, the data management system associates the one or more messages with the one or more indexes and stores the one or more messages and the one or more indexes in a local persistent storage. In various embodiments, the data management system stores the one or more indexes in a local persistent storage without associating the one or more messages with the one or more indexes.

In various embodiments, an offset (or an offset value) associated with a message includes an identifier assigned to a storage unit associated with the external system in which the message is stored. In various embodiments, the offset associated with a message may represent a position of the message stored within the storage unit. A timestamp associated with a message may represent a point of time when the message was received or written to the storage unit.

In various embodiments, a message may be a key-value message where the message includes a key paired with a value. The key may be used to determine the storage unit to which the message appends. The value may correspond to a payload (e.g., actual data) of the message.

In various embodiments, upon receiving a read request, the data management system identifies the one or more indexes associated with the one or more messages stored in the local persistent storage based on the one or more keys included in the read request. The data management system processes the read request including retrieving the one or more values associated with the one or more keys based on the one or more indexes associated with the one or more messages.

In various embodiments, the data management system detects that one or more data changes are associated with a key associated with a message. The data management system generates (or reconstructs) a current value of the key based on the one or more data changes and the index associated with the message (or the value) and processes the read request based on the current value of the key.

In various embodiments, the data management system determines that the one or more values associated with the one or more messages have been removed from the local persistent storage. The data management system reads the one or more values associated with the one or more messages from the storage unit associated with the external system. Specifically, reading the one or more values includes accessing a mapping of the one or more keys to the one or more offsets associated with the one or more messages and providing the one or more offsets to the external system.

In various embodiments, the data management system determines a frequency of access to the message. The frequency of access refers to the number of occurrences of accessing the message per unit of time (e.g., any number of seconds, minutes, hours, or days).

In various embodiments, upon determining that the frequency of access to the message is below a threshold value, the data management system deletes the message and the associated index from the local persistent storage. The threshold value may be determined by the data management system based on factors such as system latency, memory storage space, data processing power, etc.) or be determined by a system administrator or an authorized user. In various embodiments, a caching strategy, such as Least Recently Used (LRU) strategy, is used to delete (or evict) elements (e.g., messages) from the memory space (e.g., persistent storage) to make space for new messages when the memory space is full or nearly full.

In various embodiments, the data management system calculates a cache size based on a plurality of variables, including without limitation, the average rate of director job execution, the average number of items (e.g., messages) written per job execution, the average size of a plurality of messages, and the average retention of items. The data management system estimates a plurality of storage requirements for the local persistent storage based on the cache size.

In various embodiments, the data management system applies a formula, such as $E=R\times N\times S\times T$. R represents the average rate of director job execution. N represents the average number of items written per job execution. S represents the average size of the items. T represents the average retention of items Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example networked environment 100 that includes a data management system 122, according to various embodiments of the present disclosure. By including the data management system 122, the networked environment 100 can facilitate efficient data access and management in high throughput and multifaceted networked environment as described herein. As shown, the networked environment 100 includes one or more client devices 102, a server system 108, and a network 106 (e.g., including Internet, wide-area-network (WAN), local-area-network (LAN), wireless network, etc.) that are communicatively coupled together. Each client device 102 can host a number of applications, including a client software application 104. The client software application 104 can communicate data with the server system 108 via a network 106. Accordingly, the client software application 104 can communicate and exchange data with the server system 108 via the network 106.

The server system 108 provides server-side functionality via the network 106 to the client software application 104. While certain functions of the networked environment 100 are described herein as being performed by the data management system 122 on the server system 108, it will be appreciated that the location of certain functionality within the server system 108 is a design choice. For example, it may be technically preferable to initially deploy certain technology and functionality within the server system 108, but later migrate this technology and functionality to the client software application 104.

With respect to the server system 108, each of an Application Program Interface (API) server 110 and a web server 112 is coupled to an application server 116, which hosts the data management system 122. The application server 116 is communicatively coupled to a database server 118, which facilitates access to a database 120 that stores data associated with the application server 116, including data that may be generated or used by the data management system 122, in various embodiments.

The API server 110 receives and transmits data (e.g., API calls, commands, requests, responses, and authentication data) between the client device 102 and the application server 116, and between the one or more services and the application server 116. Specifically, the API server 110 provides a set of interfaces (e.g., endpoint, routines, or protocols) that can be called or queried by the client software application 104 or the one or more services in order to invoke the functionalities of the application server 116. The API server 110 exposes various functions supported by the application server 116, including without limitation: user registration; login functionality; data object operations (e.g., generating, storing, retrieving, encrypting, decrypting, transferring, access rights, licensing, etc.), and user communications.

Through one or more web-based interfaces (e.g., web-based user interfaces), the web server 112 can support various functions of the data management system 122 of the application server 116, including without limitation: receiving a write request that includes a value and a key; processing the write request including generating a message that represents the value and the key; transmitting the message to an external system (e.g., hosted by the third-party platform 124) for storage; generating an index based on a mapping of the key to an offset and/or a timestamp associated with the message; associating the message with the index; storing the message and the index in a local persistent storage; receiving a read request that includes the key; identifying, based on the key, the index associated with the message stored in the local persistent storage; and processing the read request including retrieving the value associated with the key based on the index associated with the message (or the storage of the value). In various embodiments, the deployment or implementation of the web server 112 and the application server 116 may share the same set of executable code. In various embodiments, the web server 112 may be a subsystem or a component of the application server 116.

The application server 116 hosts a number of applications and subsystems, including the data management system 122, which supports various functions and services with respect to various embodiments described herein. The application server 116 is communicatively coupled to a database server 118, which facilitates access to database(s) 120 in which may be stored data associated with the data management system 122.

In various embodiments, database(s) 120 may include one or more persistent storage units (also referred to as persistent storage) that store messages as described herein.

Figure 2:
FIG. 2 is a block diagram illustrating an example data management system, according to various embodiments of the present disclosure.
Figure 2:
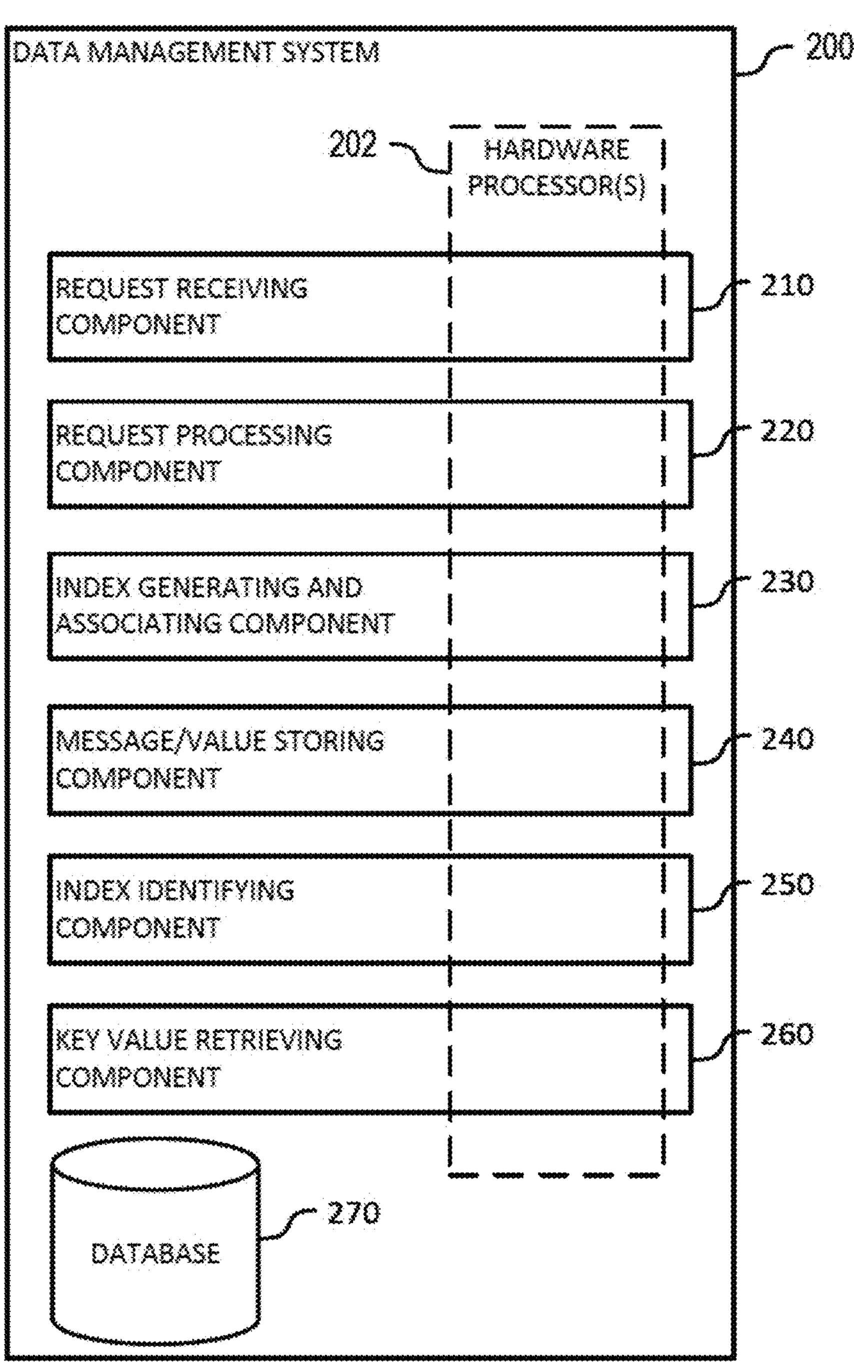

FIG. 2 is a block diagram illustrating an example data management system 200, according to various embodiments of the present disclosure. For some embodiments, the data management system 200 represents an example of the data management system 122 described with respect to FIG. 1. As shown, the data management system 200 comprises a request receiving component 210, a request processing component 220, an index generating and associating component 230, a message storing component 240, an index identifying component 250, and a key value retrieving component 260. According to various embodiments, one or more of the request receiving component 210, the request processing component 220, the index generating and associating component 230, the message storing component 240, the index identifying component 250, and the key value retrieving component 260 are implemented by one or more hardware processors 202. Data generated by one or more of the request receiving component 210, the request processing component 220, the index generating and associating component 230, the message storing component 240, the index identifying component 250, and the key value retrieving component 260 is stored in a database 270 of the data management system 200.

In various embodiments, the request receiving component 210 is configured to receive one or more write requests that include one or more values and one or more keys. The request receiving component 210 is further configured to receive one or more read requests of one or more messages previously written to a persistent storage and/or a storage unit associated with an external system, such as one hosted by the third-party platform 124, as illustrated in FIG. 1.

In various embodiments, the request processing component 220 is configured to process the one or more write requests. The processing includes generating one or more messages based on the one or more values and the one or more keys. The one or more messages represent (or include) the one or more values and the one or more keys included in the write request. A message may include a key field and a value field. The external system may include one or more storage units. Each storage unit may be a single log file that includes data written in an append-only fashion.

In various embodiments, the request processing component 220 is further configured to transmit the one or more messages to an external system for storage.

In various embodiments, the index generating and associating component 230 is configured to generate one or more indexes based on a mapping of the one or more keys to one or more offsets (or offset values) and/or one or more timestamps associated with the one or more messages. The index generating and associating component 230 is further configured to associate the one or more messages with the one or more indexes.

In various embodiments, the message storing component 240 is configured to is configured to store the one or more messages and the one or more indexes in a local persistent storage.

In various embodiments, upon receiving one or more read requests, the index identifying component 250 is configured to identify the one or more indexes associated with one or more messages (or the storage of the one or more values) stored in the local persistent storage based on one or more keys included in the one or more read request.

In various embodiments, the key value retrieving component 260 is configured to retrieve one or more values associated with the one or more keys based on the identified one or more indexes associated with the one or more messages.

Figure 3:
FIG. 3 is a flowchart illustrating an example method for managing data using persistent storage, according to various embodiments of the present disclosure.
Figure 3:
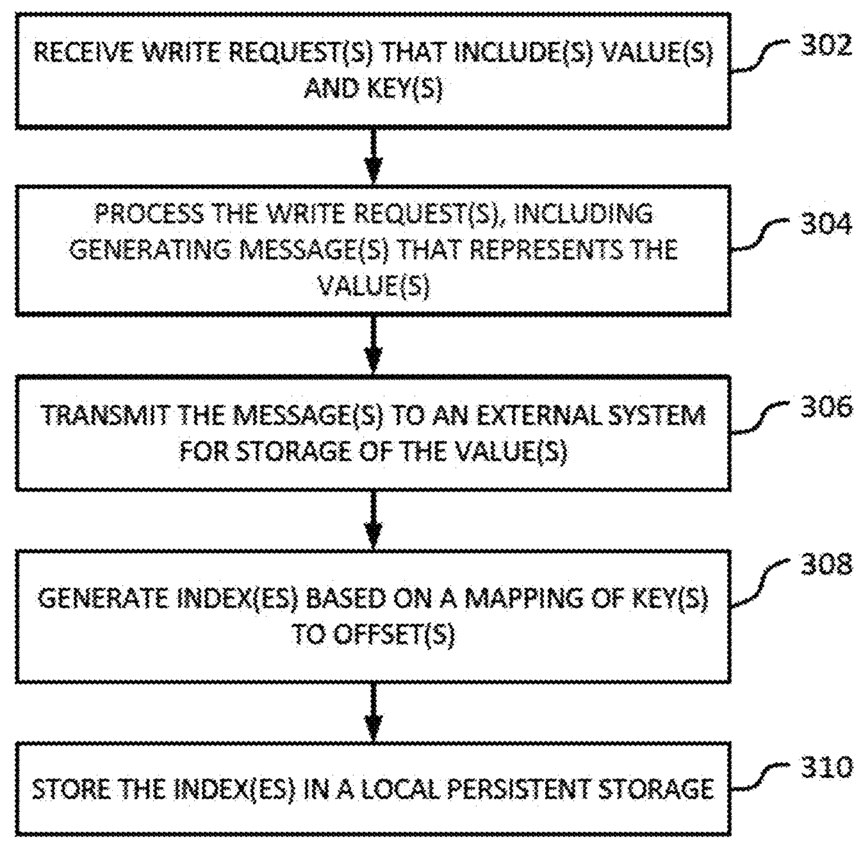

FIG. 3 is a flowchart illustrating an example method 300 for managing data using persistent storage, according to various embodiments of the present disclosure. It will be understood that example methods described herein may be performed by a machine in accordance with some embodiments. For example, the methods 300 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor receives a write request that includes one or more values and one or more keys.

At operation 304, a processor processes the write request, including generating one or more messages based on the one or more values and the one or more keys. The one or more messages represent (or include) the one or more values and the one or more keys included in the write request.

At operation 306, a processor transmits the one or more messages to an external system for storage. The external system may include one or more storage units.

At operation 308, a processor generates one or more indexes based on a mapping of the one or more keys to one or more offsets (or offset values) associated with the one or more messages. In various embodiments, an index may be generated based on a mapping of a key to an offset and/or a timestamp associated with the message. In various embodiments, a processor associates the one or more messages with the one or more indexes and stores.

At operation 310, a processor only stores the one or more indexes in a local persistent storage.

In various embodiments, a processor stores the one or more messages and the one or more indexes in a local persistent storage, on a local disk (e.g., cache), for example. The local persistent storage provides a compacted view (e.g., a copy) of external storage units in a local key-value store on a local persistent storage after consuming the data. The compact view contains copies of messages stored in the external storage units, so that customers can quickly access data from the local persistent storage without having to retrieve data from the external storage units.

Though not illustrated, the method 300 can include an operation where a graphical user interface for managing data can be displayed (or caused to be displayed) by the hardware processor. For instance, the operation can cause a computing device to display the graphical user interface for managing data. This operation for displaying the graphical user interface can be separate from operations 302 through 310 or, alternatively, form part of one or more of operations 302 through 310.

Figure 4:
FIG. 4 is a flowchart illustrating an example method for managing data using persistent storage, according to various embodiments of the present disclosure.
Figure 4:
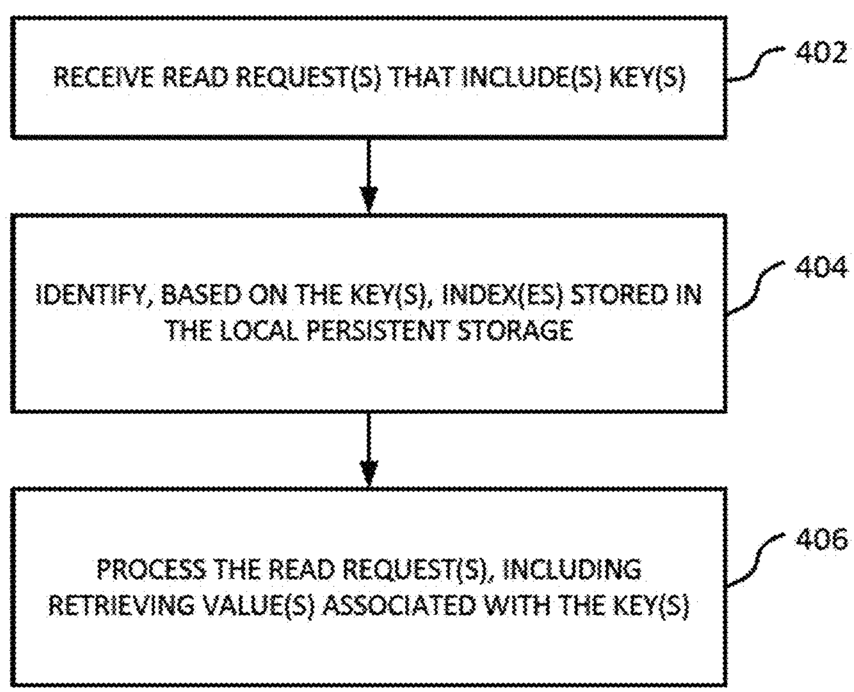

FIG. 4 is a flowchart illustrating an example method 400 for managing data using persistent storage, according to various embodiments of the present disclosure. It will be understood that example methods described herein may be performed by a machine in accordance with some embodiments. For example, the methods 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of the method 400 may be a sub-routine of one or more of the operations of method 300. In various embodiments, one or more operations in method 400 may be performed subsequent to the operations of method 300.

At operation 402, a processor receives one or more read requests that include one or more keys.

At operation 404, a processor identifies one or more indexes associated with the one or more messages stored in the local persistent storage based on the one or more keys included in the one or more read requests.

In various embodiments, operation 404 is optional where the one or more values stored in the local persistent storage (e.g., a cache) may be retrieved based on the one or more keys. The indexes are only needed when the values are not stored locally that the values are stored only in the external system.

At operation 406, a processor processes the one or more read requests, including retrieving the one or more values associated with the one or more keys from a cache in the local persistent storage.

In various embodiments, a processor processes the one or more read requests, including retrieving one or more values associated with the one or more keys based on the one or more indexes associated with the one or more messages.

Though not illustrated, the method 400 can include an operation where a graphical user interface for managing data using persistent storage can be displayed (or caused to be displayed) by the hardware processor. For instance, the operation can cause a computing device to display the graphical user interface for managing data using persistent storage. This operation for displaying the graphical user interface can be separate from operations 402 through 406 or, alternatively, form part of one or more of operations 402 through 406.

Figure 5:
FIG. 5 is a flowchart illustrating an example method for managing data using persistent storage, according to various embodiments of the present disclosure.
Figure 5:
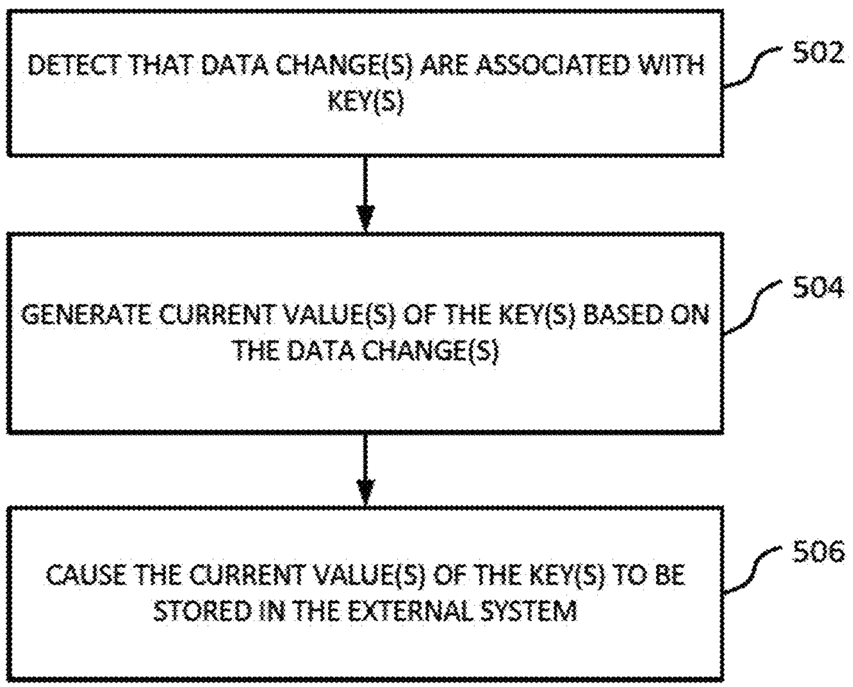

FIG. 5 is a flowchart illustrating an example method 500 for managing data using persistent storage, according to various embodiments of the present disclosure. It will be understood that example methods described herein may be performed by a machine in accordance with some embodiments. For example, the methods 500 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method

500 may be represented by executable instructions that, when executed by a processor of a computing device, cause the computing device to perform method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

In various embodiments, one or more operations of the method 500 may be a sub-routine of one or more of the operations of method 300 and/or method 400. In various embodiments, one or more operations in method 500 may be performed subsequent to the operations of method 300 and/or method 400.

At operation 502, a processor detects that one or more data changes are associated with a key associated with a message.

At operation 504, a processor generates (or reconstructs) a current value of the key based on the one or more data changes. In various embodiments, a processor generates (or reconstructs) a current value of the key based on the one or more data changes and the index associated with the message.

At operation 506, a processor causes the current value of the key to be stored in the external system.

In various embodiments, a processor processes the read request based on the current value of the key. The processing of the read request includes providing the value of the message to the sender of the read request.

Though not illustrated, the method 500 can include an operation where a graphical user interface for managing data using persistent storage can be displayed (or caused to be displayed) by the hardware processor. For instance, the operation can cause a computing device to display the graphical user interface for managing data using persistent storage. This operation for displaying the graphical user interface can be separate from operations 502 through 506 or, alternatively, form part of one or more of operations 502 through 506.

Figure 6:
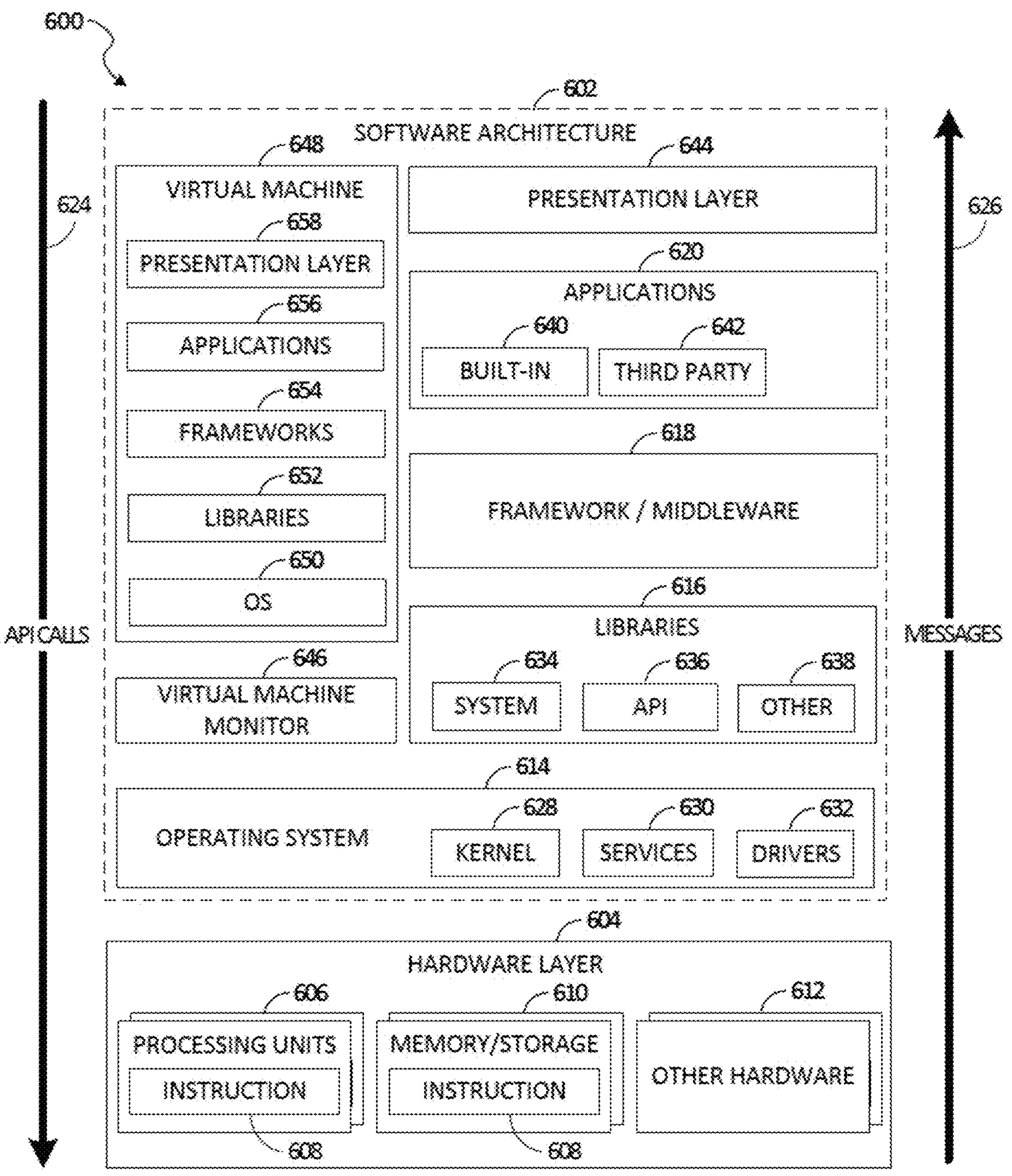
FIG. 6 is a block diagram illustrating a representative software architecture, which may be used in conjunction with various hardware architectures herein described, according to various embodiments of the present disclosure.

FIG. 6 is a block diagram illustrating an example of a software architecture 602 that may be installed on a machine, according to some example embodiments. FIG. 6 is merely a non-limiting example of software architecture, and it will be appreciated that many other architectures may be implemented to facilitate the functionality described herein. The software architecture 602 may be executing on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 comprises one or more processing units 606 having associated executable instructions 608. The executable instructions 608 represent the executable instructions of the software architecture 602. The hardware layer 604 also includes memory or storage modules 610, which also have the executable instructions 608. The hardware layer 604 may also comprise other hardware 612, which represents any other hardware of the hardware layer 604, such as the other hardware illustrated as part of the machine 800.

In the example architecture of FIG. 6, the software architecture 602 may be conceptualized as a stack of layers, where each layer provides particular functionality. For example, the software architecture 602 may include layers such as an operating system 614, libraries 616, frameworks/middleware 618, applications 620, and a presentation layer 644. Operationally, the applications 620 or other components within the layers may invoke API calls 624 through the software stack and receive a response, returned values, and so forth (illustrated as messages 626) in response to the API calls 624. The layers illustrated are representative in nature, and not all software architectures have all layers. For example, some mobile or special-purpose operating systems may not provide a frameworks/middleware 618 layer, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than by interfacing directly with the underlying operating system 614 functionality (e.g., kernel 628, services 630, or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be utilized by the applications 620 or other software components/modules. For example, the frameworks 618 may provide various graphical user interface functions, high-level resource management, high-level location services, and so forth. The frameworks 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a home application, a contacts application, a browser application, a book reader application, a location application, a media application, a messaging application, or a game application.

The third-party applications 642 may include any of the built-in applications 640, as well as a broad assortment of other applications. In a specific example, the third-party applications 642 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 642 may invoke the API calls 624 provided by the mobile operating system such as the operating system 614 to facilitate functionality described herein.

The applications 620 may utilize built-in operating system functions (e.g., kernel 628, services 630, or drivers 632), libraries (e.g., system libraries 634, API libraries 636, and other libraries 638), or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with the user.

Some software architectures utilize virtual machines. In the example of FIG. 6, this is illustrated by a virtual machine 648. The virtual machine 648 creates a software environment where applications/modules can execute as if they were executing on a hardware machine (e.g., the machine 700 of FIG. 7). The virtual machine 648 is hosted by a host operating system (e.g., the operating system 614) and typically, although not always, has a virtual machine monitor 646, which manages the operation of the virtual machine 648 as well as the interface with the host operating system (e.g., the operating system 614). A software architecture executes within the virtual machine 648, such as an operating system 650, libraries 652, frameworks/middleware 654, applications 656, or a presentation layer 658. These layers of software architecture executing within the virtual machine 648 can be the same as corresponding layers previously described or may be different.

Figure 7:
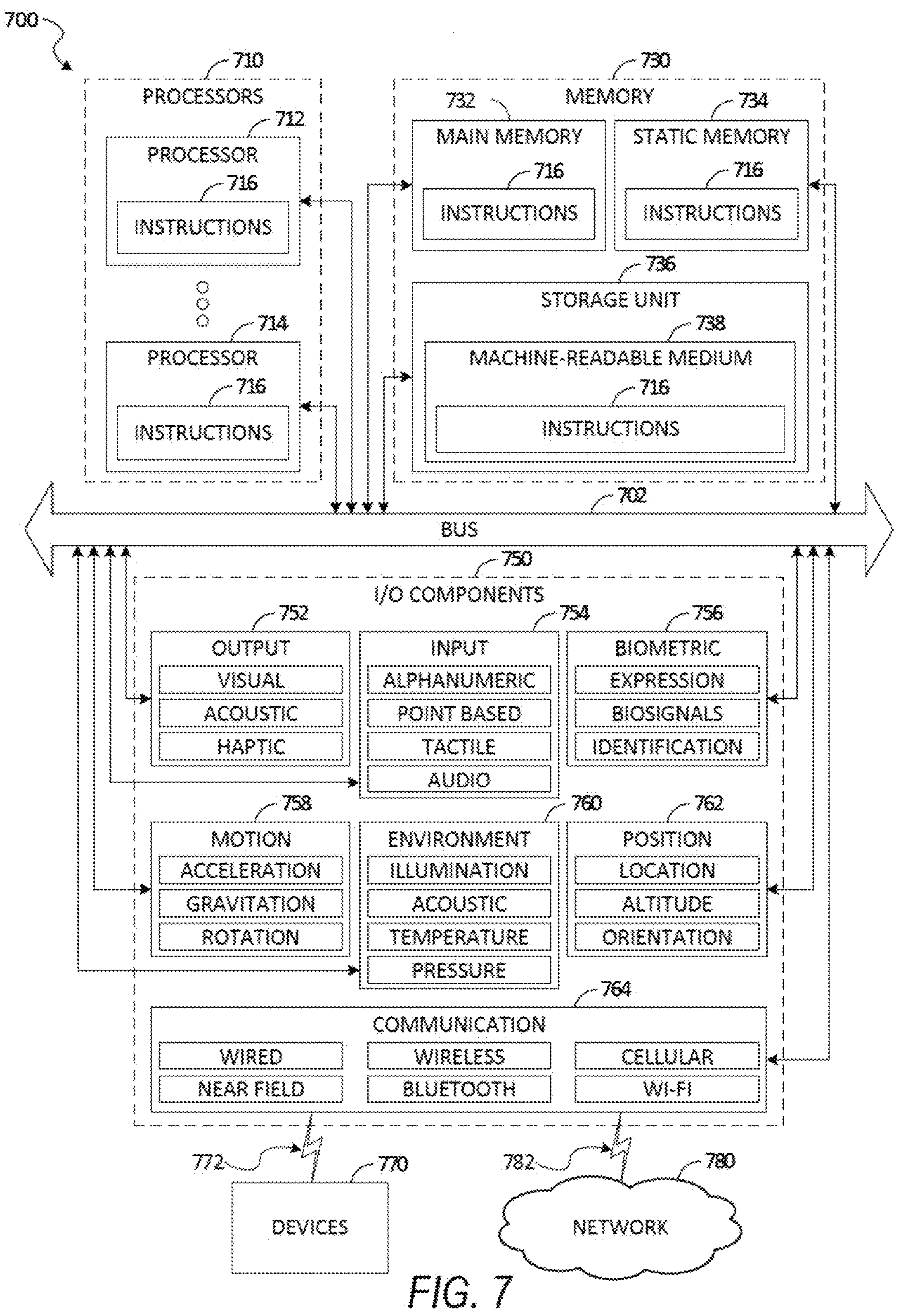
FIG. 7 is a block diagram illustrating components of a machine able to read instructions from a machine storage medium and perform any one or more of the methodologies discussed herein according to various embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method 300 described above with respect to FIG. 3, the method 400 described above with respect to FIG. 4, and the method 500 described above with respect to FIG. 5. Instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an embodiment, the processors 710 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory 730 may include a main memory 732, a static memory 734, and a storage unit 736 including machine-readable medium 738, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 750 may include biometric components 756, motion components 758, environmental components 760, or position components 762, among a wide array of other components. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 700 including processors 710), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 700, but deployed across a number of machines 700. In some example embodiments, the processors 710 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 730, 732, 734, and/or the memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 780 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A method comprising:

receiving a read request that comprises a key;

identifying an index based on the key, the index corresponding to one or more messages stored in a cache of a local persistent storage;

reconstructing a value of the key based on the one or more messages; and processing the read request based on the value of the key.

2. The method of claim 1, comprising:

determining that the one or more messages comprise data changes to the key, and reconstructing the value of the key comprising applying the data changes to content of the one or more messages.

3. The method of claim 1, comprising:

determining that the one or more messages have been removed from the cache of the local persistent storage; and reading the one or more messages from an external system, the reading comprising accessing a mapping of the key to one or more offsets associated with the one or more messages, and providing the one or more offsets to the external system.

4. The method of claim 3, wherein an offset from the one or more offsets comprises an identifier assigned to a storage unit associated with the external system and wherein the offset represents a position of a message stored in the storage unit.

5. The method of claim 3, wherein the local persistent storage provides a compact view of messages stored in the external system in a local key-value store.

6. The method of claim 1, wherein the key is a first key, wherein the value is a first value, wherein the index is a first index, comprising:

receiving a write request that comprises a second value and a second key;

processing the write request, the processing of the write request comprising generating a message that comprises the second value;

transmitting the message to an external system for storage, the message being associated with an offset value indicating a storage position of the message in the external system;

generating a second index based on the offset value associated with the message and the second key; and storing the second index in the local persistent storage.

7. The method of claim 6, further comprising:

storing the second value in the cache of the local persistent storage;

determining that a frequency of access to the second value from the cache in the local persistent storage is below a threshold value; and deleting the second value and the second index from the cache of the local persistent storage.

8. The method of claim 7, wherein the threshold value is determined based on one or more factors comprising system latency, memory storage space, data processing power, and a configuration determined by a system administrator or an authorized user.

9. The method of claim 1, further comprising:

accessing a plurality of variables;

applying a formula to calculate a cache size based on one or more variables; and estimating a plurality of storage requirements for the local persistent storage based on the cache size.

10. The method of claim 9, wherein the one or more variables comprises one or more of an average rate of director job execution, an average number of items written per job execution, an average size of a plurality of messages, and an average retention of items.

11. A system comprising:

at least one memory storing instructions; and one or more hardware processors communicatively coupled to the memory and configured by the instructions to perform operations comprising:

receiving a read request that comprises a key;

identifying an index based on the key, the index corresponding to one or more messages stored in a cache of a local persistent storage;

reconstructing a value of the key based on the one or more messages; and processing the read request based on the value of the key.

12. The system of claim 11, wherein the operations comprise:

determining that the one or more messages comprise data changes to the key, and reconstructing the value of the key comprising applying the data changes to content of the one or more messages.

13. The system of claim 11, wherein the operations comprise:

determining that the one or more messages have been removed from the cache of the local persistent storage; and reading the one or more messages from an external system, the reading comprising accessing a mapping of the key to one or more offsets associated with the one or more messages, and providing the one or more offsets to the external system.

14. The system of claim 13, wherein an offset from the one or more offsets comprises an identifier assigned to a storage unit associated with the external system and wherein the offset represents a position of a message stored in the storage unit.

15. The system of claim 13, wherein the local persistent storage provides a compact view of messages stored in the external system in a local key-value store.

16. The system of claim 11, wherein the key is a first key, wherein the value is a first value, wherein the index is a first index, and wherein the operations comprise:

receiving a write request that comprises a second value and a second key;

processing the write request, the processing of the write request comprising generating a message that comprises the second value;

transmitting the message to an external system for storage, the message being associated with an offset value indicating a storage position of the message in the external system;

generating a second index based on the offset value associated with the message and the second key; and storing the second index in the local persistent storage.

17. The system of claim 16, wherein the operations comprise:

storing the second value in the cache of the local persistent storage;

determining that a frequency of access to the second value from the cache in the local persistent storage is below a threshold value; and deleting the second value and the second index from the cache of the local persistent storage.

18. The system of claim 17, wherein the threshold value is determined based on one or more factors comprising system latency, memory storage space, data processing power, and a configuration determined by a system administrator or an authorized user.

19. The system of claim 11, wherein the operations comprise:

accessing a plurality of variables;

applying a formula to calculate a cache size based on one or more variables; and estimating a plurality of storage requirements for the local persistent storage based on the cache size.

20. A non-transitory computer-readable medium comprising instructions that, when executed by a hardware processor of a device, cause the device to perform operations comprising:

receiving a read request that comprises a key;

identifying an index based on the key, the index corresponding to one or more messages stored in a cache of a local persistent storage;

reconstructing a value of the key based on the one or more messages, and processing the read request based on the value of the key.

* * * * *